Oct. 27, 1959 F. G. SPLITT 2,910,529

TRANSFORMER COUPLING OF COLOR SIGNAL

Filed Oct. 5, 1956

INVENTOR
FRANK G. SPLITT
BY Elmer J. Gorn
ATTORNEY

United States Patent Office 2,910,529

Patented Oct. 27, 1959

2,910,529

TRANSFORMER COUPLING OF COLOR SIGNAL

Frank G. Splitt, Chicago, Ill., assignor to Raytheon Company, a corporation of Delaware Application October 5, 1956, Serial No. 614,155

4 Claims. (Cl. 178—5.4)

This invention relates to a transformer design that minimizes the coupling variations between a primary and secondary coil that occur during a tuning operation of said primary coil and, more specifically, to a color television receiver having improved parameters by utilizing said transformer.

In this invention there is disclosed a transformer having a coil form adapted to hold windings on the periphery thereof. A first or primary coil is wound on said form in such a manner that a single wire diameter opening is left between successive turns. A second or secondary coil is bifilar wound with respect to a portion of said first coil by winding said second coil on said coil form in the openings provided between said successive turns of said first coil. Tuning of said coil is accomplished by introducing a movable slug in the area influenced only by said first coil. This tuning slug has the effect of linking with the flux linkages of the first coil only and hence does not affect the flux linkages between the bifilar portion of said first coil and said second coil. In this manner, tuning can be accomplished without affecting the coupling between said primary and said secondary coils. The term bifilar as used in this application has the usual meaning, which is that the primary and secondary coils of a transformer are in such a relationship that substantially unity coupling exists between said primary and secondary coils.

Further objects and advantages of this invention, and the particular adaptability of the disclosed invention to a color television receiver, will be made more apparent as the description progresses. Reference is now being made to the accompanying drawings.

Figure 1:
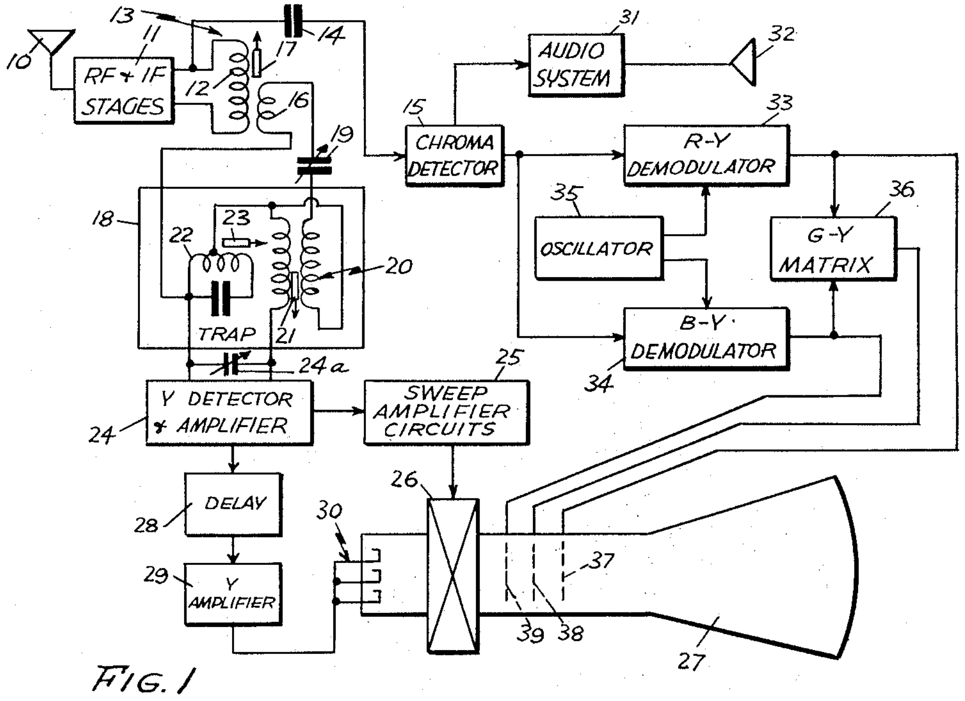
Fig. 1 is a block diagram of a color television receiver illustrating a complete circuit utilizing this invention.

Referring now to Fig. 1, there is shown a color television receiver of the type utilizing the NTSC color system which is more fully described in an article "Principles of NTSC Compatible Television," page 88 of Electronics Magazine published by McGraw-Hill Publications in the February 1952 edition.

Antenna 10 feeds a conventional RF and IF stage 11, which stage usually contains a tuner followed by a video IF system that is somewhat more extensive than the video IF system of a monochrome set in that usually more IF stages are used and the band pass is somewhat wider. The output of IF and RF stage 11 is fed to a primary coil 12 of IF output transformer 13. The output of IF and RF stage 11 is also coupled through capacitor 14 to a chroma detector 15. IF transformer 13 comprises a secondary coil 16 that is bifilar wound with only a portion of primary coil 12. Tuning is accomplished by means of a movable tuning slug 17 adapted to move only in the field produced by that portion of primary winding 12 that is not bifilar wound with secondary coil 16. Transformer 13 will be more fully defined further. The output of secondary coil 16 is connected to a suitable 41.25 megacycle trap 18 through a variable coupling capacitor 19. Trap 18 is of the conventional type and consists of a tunable bifilar transformer 20 capable of being tuned by tuning slug 21 in combination with a parallel resonant circuit 22 capable of being tuned by tuning slug 23. The output of trap 18 is fed to a luminance or Y detector and amplifier 24, having a variable input capacitor 24*a*. Trap 18 prevents audio and color components of the composite wave from being fed to Y detector and amplifier 24. The output of Y detector and amplifier 24 consists of the usual monochrome video and sync information. The sweep information is coupled with stage 24 to a sweep amplifier circuit 25, which in turn feeds deflection coils 26 that are located on a conventional type tri-color picture tube 27. The video information from Y detector and amplifier 24 is connected to a time-delaying network 28 which slows down the video signal before said signal is re-combined with the color component signals. This delay is necessary since the band width of the Y signal is so much greater than the band width of the color component signals in view of the phenomenon that narrow band-width signals are delayed more than wider band-width signals. It is quite imperative in any color television receiver that all component signals arrive at the picture tube at the same time in order to recombine properly. Delay stage 28 feeds Y amplifier 29, which in turn feeds the Y signal in the proper phase and amplitude to the cathodes 30 of picture tube 27.

Detection in a color receiver is a two-stage process wherein first, the carrier that brought the signal is removed, which carrier contains the Y signal previously described. The color subcarriers are then removed in order to make the color video frequencies available. Chroma detector 15 is the second of the two detectors and has in turn two output signals, one of which is the conventional subcarrier fed to audio system 31 and eventually to speaker 32, and the second output signal is the so-called color signal, which is fed to both a $R-Y$ demodulator 33 and a $B-Y$ demodulator 34. The color detector also supplies the color burst signal, which has not been illustrated. Oscillator stage 35 feeds both the $R-Y$ demodulator 33 and the $B-Y$ demodulator 34, thereby creating at the output of said stages the demodulated $R-Y$ and $B-Y$ color signals. Since the color information contained in the composite video signal is basically a rotating vector, it is possible to demodulate any component color signal by simply choosing the proper phase relationship of oscillator 35 which controls demodulators 33 and 34. In the system illustrated, demodulator 33 detects the $R—Y$ signal and demodulator 34 detects the $B—Y$ signal. The $G—Y$ signal is obtained in the conventional manner by feeding a portion of the $R—Y$ signal from the output of demodulator signal 33 to a $G-Y$ matrix 36. In a conventional manner the $B-Y$ signal is connected from demodulator 34 to the $G-Y$ matrix 36. The $R-Y$ signal from demodulator 33 is fed to grid 37 of color tube 27, as in a conventional manner the $G-Y$ signal from matrix 36 is fed to grid 38, and the $B-Y$ signal is fed from demodulator 34 to grid 39, said grids being located in color tube 27. It will be observed further that in the color system defined in Fig. 1 it is not necessary to obtain separate R, G and B signals since the color tube 27 is used as the matrix. Utilizing the color tube as a matrix is well known in the art today.

Heretofore, tuning of trap 18 to the required 41.25 megacycles has resulted in inconsistent output signals of the chroma detector 15 in the region of the color subcarrier, which is known generally as the band of frequency from 41.67 megacycles to 42.67 megacycles. These inconsistent output signals have resulted from the variations in the reflected impedance of trap 18 into the primary circuit of transformer 13. It was found further that having inconsistent signals at the output of chroma detector 15 resulted in variations of gain, with the result that AGC problems arose. Tuning of the primary to correct for the reflected impedance of trap 18 had an adverse effect on the chroma response curve, since tuning of the primary resulted in variation in coupling of the secondary coil, which in turn changed the signal strength output. In order to correct these aforementioned difficulties, it was always necessary to continually tune and retune the aforementioned circuits, which made the circuits extremely critical and difficult to tune.

Figure 2:
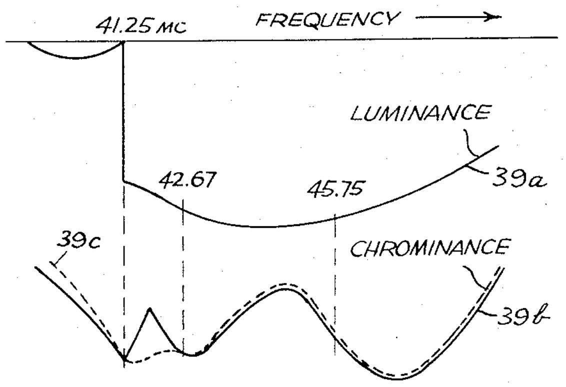
Fig. 2 is a graph illustrating the advantages gained by utilizing this invention.
Figure 3:
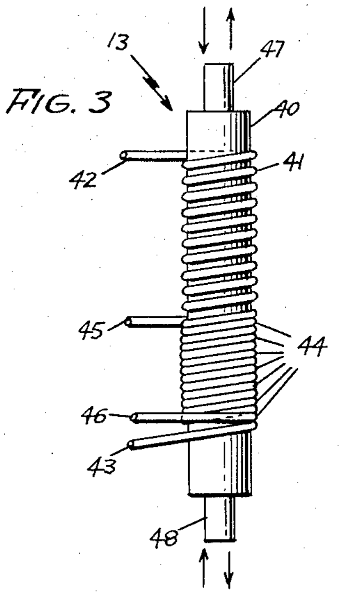
Fig. 3 illustrates an embodiment of this invention.

By utilizing the transformer to be described in Fig. 3 in combination with the tuning procedure now being described, which utilizes the reflected impedance from trap 18, it is now possible to accurately tune the color receiver without the aforementioned difficulties. It was discovered that once the primary to secondary coils of transformer 13 were fixed, such as in a bifilar relationship, the shape of the color response in the subcarrier region could be controlled by selecting proper values of capacitor 19 and capacitor 24*a*. It was also found that there exists a circuit set of parameters that would yield an essentially overcoupled chrominance response with controlled wave shape in the subcarrier region along with the desired luminance response. This effect was achieved by incorporating the reflected impedance of trap 18 into primary circuit of transformer 13 and then controlling the selection of capacitor 19 and capacitor 24*a*. The success of this tuning procedure is predicated on the parameter of transformer 13, which allows the primary to be tuned without affecting the coupling between said primary and secondary. Fig. 2 illustrates as a function of frequency, a graph showing the desired luminance output signal 39*a* that should be fed to the Y detector and amplifier 24. Fig. 2 also illustrates the chrominance signal 39*b* as a solid line, which curve shows the effect of the reflected impedance into the primary circuit due to the tuning of trap 18 in the color subcarrier area, which is that region between 41.25 megacycles to 42.67 megacycles. The dotted line curve 39*c* illustrates how the effect of the reflected impedance is removed by utilizing the transformer described in this invention in the television circuit illustrated in Fig. 1.

Referring now to Fig. 3, there is shown a transformer constructed in accordance with the principles of this invention having a frequency range of approximately 30 to 60 megacycles, which is the desired IF frequencies of currently used color television circuits. It is necessary, due to presently available circuit capacitors and design consideration, such as band width and gain, that the physical size of these transformers be made quite small, with the result, whenever a core is introduced into a coil of relatively small size for the purpose of tuning, that an undesired amount of impedance is reflected into the primary circuit, thereby materially affecting the coupling between the primary and secondary coils. The transformer now to be described eliminates this difficulty in a simple and direct manner without the need of external compensating circuitry or special techniques. In Fig. 3 there is shown a coil form 40, preferably constructed of a non-inductive material. Wound upon coil form 40 is a first or primary coil 41 wound in such a manner that a single wire diameter opening exists between successive turns. First coil 41 would commonly be known as a primary coil and have terminals 42 and 43. A second or secondary coil 44 having terminals 45 and 46 is wound on coil form 40 in the openings provided by said successive turns of said first coil and further, said second coil 44 contacting coil form 40. By this technique it is possible to achieve unity coupling between second coil 44, commonly known as a secondary, and that portion of first coil 41, which is interwound between said second coil. The primary is made tunable by providing a moving ferrite core 47, which core is capable of being moved within coil form 40 to such a depth that core 47 moves in an area only influenced by said first coil 41. In order to provide complete flexibility between independent tuning of the primary and tuning of the coupling, a second moving ferrite core 48 is provided at the opposite extremity of coil form 40 and capable of being moved in an area only influenced by both said first coil 41 and said second coil 44. The resulting transformer as illustrated in Fig. 3 therefore utilizes on a single form, a single layer type coil which is recognized as the cheapest type to manufacture. In actual use, transformer 13 would be located in a shield can, not illustrated, which can will have suitable openings for moving cores 47 and 48.

This completes the description of the embodiments of the invention described herein. However, many modifications and advantages thereof will be apparent to persons skilled in the art without departing from the spirit and scope of this invention. For example, this transformer and method of tuning a color television receiver is not limited to any particular form of television system, but rather to any particular transformer having similar problems. Accordingly, it is desired that this invention not be limited to the particular details of this embodiments disclosed herein, except as defined by the appended claims.

What is claimed is:

1. A color television receiver comprising means for receiving a composite signal, means for producing an intermediate frequency from said composite signal, means for feeding said intermediate frequency signal to both a transformer and a chroma and sound detector, said transformer comprising a first coil space wound on a coil form by having a single wire diameter opening between successive turns, and a second coil bifilar wound with respect to only a portion of said first coil, said second coil being wound in the openings provided between said successive turns of said first coil, means for coupling said second coil to a luminance detector and amplifier circuit for producing a luminance signal, means for producing color signals from said chroma detector, and means for feeding said color signals and said luminance signal to a color tube in the proper phase and amplitude relationship with each other for reproducing said received composite signal.

2. A color television receiver comprising means for receiving a composite signal, means for producing an intermediate frequency from said composite signal, means for feeding said intermediate frequency signal to both a transformer and a chroma detector, said transformer comprising a first coil space wound on a coil form by having a single wire diameter opening between successive turns, and a second coil bifilar wound with respect to only a portion of said first coil, said second coil being wound in the openings provided between said successive turns of said first coil, means for coupling said second coil to a luminance detector for producing a luminance signal, means for producing color signals from said chroma detector, and means for feeding said color signals and said luminance signal to a color tube in the proper phase and amplitude relationship with each other for reproducing said received composite signal.

3. A color television receiver comprising means for receiving a composite signal, means for producing an intermediate frequency from said composite signal, means for feeding said intermediate frequency signal to both a transformer and a chroma and sound detector, said transformer comprising a first coil space wound on a coil form by having a single wire diameter opening between successive turns, and a second coil bifilar wound with respect to only a portion of said first coil, said second coil being wound in the openings provided between said successive turns of said first coil, means for coupling said second coil to a trap circuit thereby preventing any portion of the sound and chroma signals from passing therethrough, means for coupling the output of said trap circuit to a luminance detector and amplifier circuit for producing a luminance signal, means for producing said color signals from said chroma signal, and means for feeding said color signals and said luminance signal to a color tube in the proper phase and amplitude relationship with each other for reproducing said received composite signal.

4. A color television receiver comprising means for receiving a composite signal, means for producing an intermediate frequency from said composite signal, means for feeding said intermediate frequency signal to both a transformer and a chroma and sound detector, said transformer comprising a first coil space wound on a coil form by having a single wire diameter opening between successive turns, and a second coil bifilar wound with respect to only a portion of said first coil, said second coil being wound in the openings provided between said successive turns of said first coil, means for coupling said second coil through a capacitor to a trap circuit thereby preventing any portion of the chroma and sound signals from passing therethrough, means for coupling the output of said trap circuit through an input capacitor to a luminance detector and amplifier circuit for producing a luminance signal, means for producing color signals from said chroma signal, and means for feeding said color signals and said luminance signal to a color tube in the proper phase and amplitude relationship with each other for reproducing said received composite signal.

References Cited in the file of this patent

UNITED STATES PATENTS

| | | |
|---|---|---|
| 2,729,796 | Hulst | Jan. 3, 1956 |
| 2,757,347 | Pozaryski | July 31, 1956 |
| 2,770,673 | Creamer | Nov. 13, 1956 |